(12) United States Patent
Shimizu

(10) Patent No.: US 8,448,861 B2
(45) Date of Patent: May 28, 2013

(54) CODE READING APPARATUS AND CONTROL METHOD

(75) Inventor: Toshinari Shimizu, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/220,916

(22) Filed: Aug. 30, 2011

(65) Prior Publication Data

US 2012/0048928 A1    Mar. 1, 2012

(30) Foreign Application Priority Data

Sep. 1, 2010  (JP) .................................. 2010-196202
May 12, 2011  (JP) .................................. 2011-107251

(51) Int. Cl.
*G06K 15/00*     (2006.01)

(52) U.S. Cl.
USPC ................. 235/383; 235/462.01; 235/462.08; 235/462.41

(58) Field of Classification Search
USPC .................... 235/435, 462.01, 462.08, 462.41
See application file for complete search history.

(56) References Cited

U.S. PATENT DOCUMENTS

2005/0279832 A1*  12/2005  Kobayashi et al. ...... 235/462.07
2008/0011836 A1*  1/2008   Adema et al. ................. 235/383

FOREIGN PATENT DOCUMENTS

| JP | 08-202945 | 8/1996 |
|---|---|---|
| JP | 09-259355 | 10/1997 |
| JP | 2007-334493 | 12/2007 |
| JP | 2008-033640 | 2/2008 |
| JP | 2008-257462 | 10/2008 |

OTHER PUBLICATIONS

Japanese Office Action for Japanese Application No. 2011-107251 mailed Oct. 23, 2012.

* cited by examiner

*Primary Examiner* — Kristy A Haupt
(74) *Attorney, Agent, or Firm* — Turocy & Watson, LLP

(57) ABSTRACT

According to one embodiment, a code reading apparatus includes: an image capturing section configured to capture an image picked up by an image pickup section; a code reading section configured to detect a Code symbol included in the captured image and read code information corresponding to the code symbol; and a display output section configured to output an image captured when the code information is read to a display device provided to face a customer.

10 Claims, 8 Drawing Sheets

CODE READING APPARATUS AND CONTROL METHOD

CROSS-REFERENCE TO RELATED APPLICATIONS

This application is based upon and claims the benefit of priority from the prior Japanese Patent Application No. 2011-107251, filed on May 12, 2011 based on the prior Japanese Patent Application No. 2010-196202, filed on Sep. 1, 2010; the entire contents of which are incorporated herein by reference.

FIELD

Embodiments described herein relate generally to a code reading apparatus and a control method.

BACKGROUND

In the past, a supermarket or the like uses a commodity code reading apparatus that picks up an image of a code symbol such as a barcode or a two-dimensional code (e.g., a QR code (registered trademark)) affixed to a commodity using a digital camera such as a CCD image sensor and detects and decodes the code symbol detected from the picked-up image to read a commodity code. A store clerk takes out a commodity stored in a shopping basket carried to a counter table by a customer and holds the commodity over the digital camera of the commodity code reading apparatus to register the commodity that the customer is about to purchase.

However, in the commodity code reading apparatus in the past, when the store clerk takes out a commodity stored in a shopping basket and holds the commodity over the digital camera of the commodity code reading apparatus, it could be difficult for a customer to see the commodity. Therefore, in some case, the customer cannot easily check the commodity when a commodity code of the commodity is read to register the commodity.

DETAILED DESCRIPTION

In general, according to one embodiment, a code reading apparatus includes an image capturing section, a code reading section, and a display output section. According to another embodiment, a control method for the code reading apparatus includes an image capturing step, a code reading step, and a display output step.

The image capturing section (step) captures an image picked up by an image pickup section. The code reading section (step) detects a code symbol included in the captured image and reads code information corresponding to the code symbol. The display output section (step) outputs an image captured when the code information is read to a display device provided to face a customer.

A code reading apparatus and a control method according to an embodiment are explained with reference to the drawings using a checkout system as an example. The checkout system is, for example, a POS terminal that performs registration and settlement of commodities purchased in one transaction. This embodiment is an application example to a checkout system installed in a store such as a restaurant or a supermarket.

Figure 1:
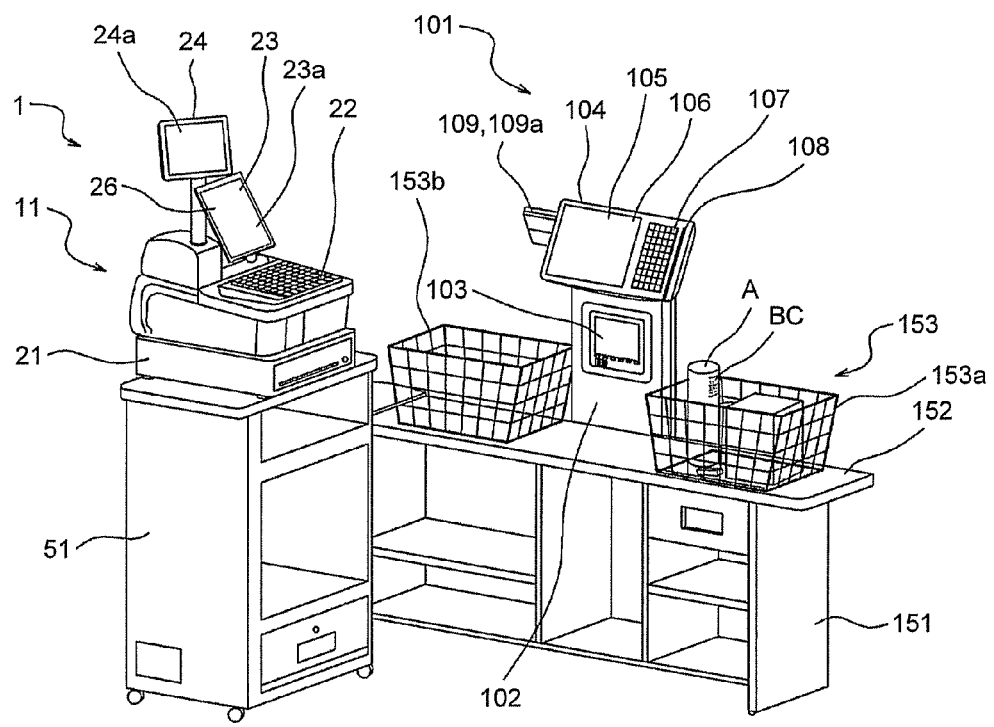
FIG. 1 is a perspective view of a checkout system according to an embodiment.

FIG. 1 is a perspective view of a checkout system 1. As shown in FIG. 1, the checkout system 1 includes a POS terminal 11 that performs registration and settlement of commodities purchased in one transaction. The POS terminal 11 is placed on an upper surface of a drawer 21 on a checkout table 51. The drawer 21 is controlled to be opened by the POS terminal 11. A keyboard 22 pressed by an operator (a user) is arranged on an upper surface of the POS terminal 11. A display device 23 configured to display information to the operator is provided further on the depth side than the keyboard 22 viewed from the operator who operates the keyboard 22. The display device 23 displays information on a display surface 23a thereof. A touch panel 26 is laminated on the display surface 23a. A customer display device 24 is vertically provided to freely rotate further on the depth side than the display device 23. The customer display device 24 displays information on a display surface 24a thereof. In the customer display device 24 shown in FIG. 1, the display surface 24a is faced to the front side in FIG. 1. However, the customer display device 24 is rotated so that the display surface 24a face the depth side in FIG. 1, whereby the customer display device 24 displays information to the customer.

A counter table 151 having a laterally long table shape is arranged to form an L shape with the checkout table 51 on which the POS terminal 11 is placed. A loading surface 152 is formed on an upper surface of the counter table 151. A shopping basket 153 that stores a commodity affixed with a barcode BC is placed on the loading surface 152. The shopping basket 153 can be considered separately as a first shopping basket 153a carried in by the customer and a second shopping basket 153b located in a position across a commodity code reading apparatus 101 from the first shopping basket 153a.

The commodity code reading apparatus 101 connected to the POS terminal 11 to freely transmit and receive data to and from the POS terminal 11 is set on the loading surface 152 of the counter table 151. The commodity code reading apparatus 101 includes a housing 102 having a thin rectangular shape. A reading window 103 is arranged in front of the housing 102. A display and operation section 104 is attached to an upper part of the housing 102. A display device 106, on a surface of which a touch panel 105 is laminated, is provided in the display and operation section 104. A keyboard 107 is disposed on the right of the display device 106. A card reading groove 108 of a not-shown card reader is provided on the right of the keyboard 107. A customer display device 109 for displaying information to the customer, which is a display device provided to face the customer, is set on the left depth side on a rear surface of the display and operation section 104 viewed from the operator. A customer touch panel 109a is laminated on a display surface of the customer display device 109.

Commodities A purchased in one transaction are stored in the first shopping basket 153a carried in by the customer. Barcodes BC obtained by encoding commodity codes (code information) concerning the commodities A are affixed to the commodities A. The commodities A are moved to the second shopping basket 153b by a hand of the operator. In a process of this movement, the barcodes BC are faced to the reading window 103 of the commodity code reading apparatus 101. An image pickup section 164 (see FIG. 2) arranged on the depth side of the reading window 103 picks up images of the barcodes BC. The commodity code reading apparatus 101 detects and decodes the barcode BC for each of the commodities A included in the image picked up by the image pickup section 164 to read the commodity code corresponding to the commodity A. Subsequently, the commodity code reading apparatus 101 outputs the read commodity code to the POS terminal 11.

The commodity code described as the barcode BC is a code allocated to each commodity to specify the commodity A. For example, the commodity code is a JAN code, which is a thirteen digit number. In this embodiment, the barcode BC is explained as an example of a code symbol. However, it goes without saying that the code symbol is a two-dimensional code such as a QR code (registered trademark).

Figure 2:
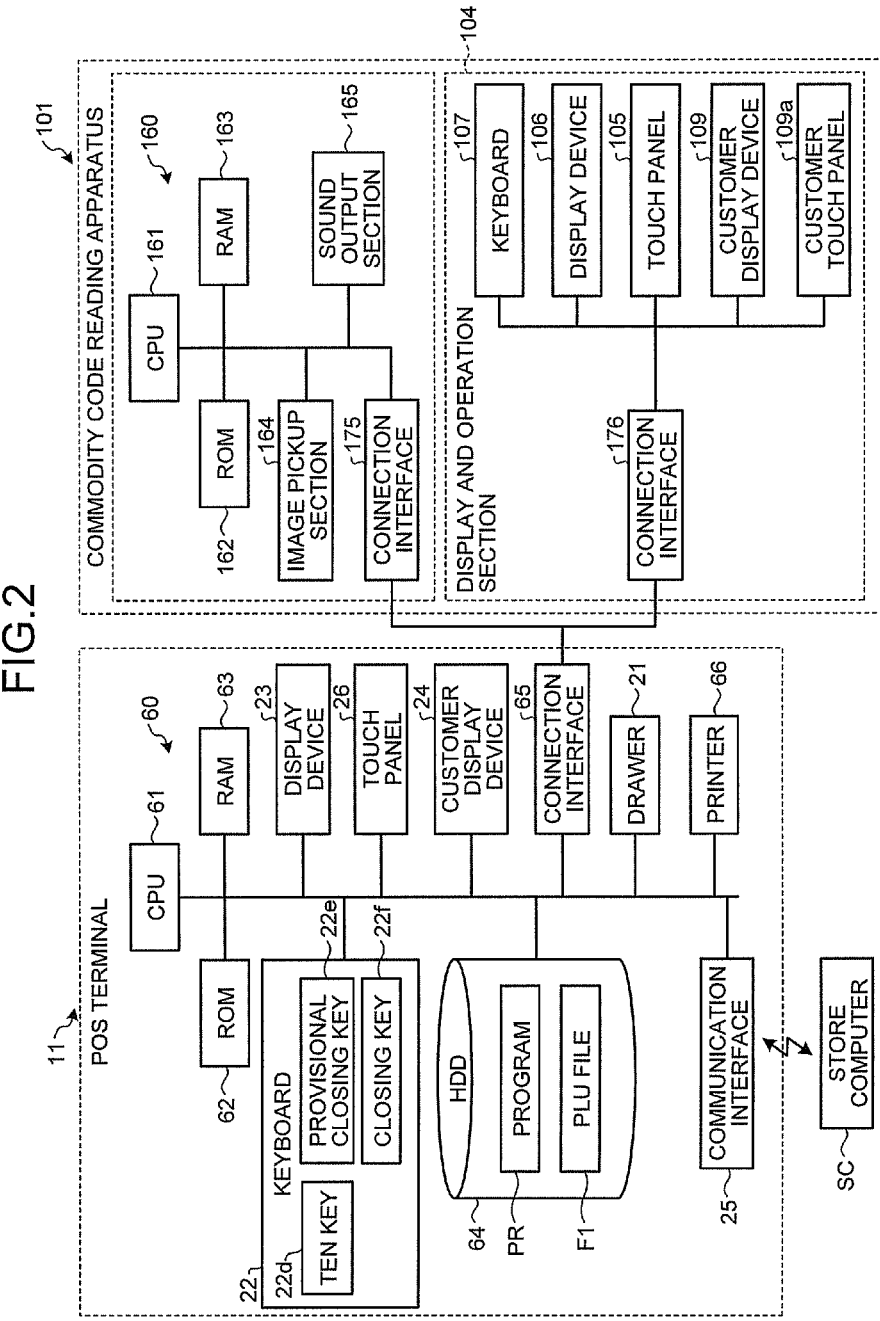
FIG. 2 is a block diagram of hardware configurations of a POS terminal and a commodity code reading apparatus according to the embodiment.

FIG. 2 is a block diagram of hardware configurations of the POS terminal 11 and the commodity code reading apparatus 101. The POS terminal 11 includes a microcomputer 60 functioning as an information processing section configured to execute information processing. The microcomputer 60 is configured by connecting, via a bus, a ROM (Read Only Memory) 62 and a RAM (Random Access Memory) 63 to a CPU (Central Processing Unit) 61 configured to execute various kinds of arithmetic processing and control sections. All of the drawer 21, the keyboard 22, the display device 23, the touch panel 26, and the customer display device 24 are connected to the CPU 61 of the POS terminal 11 via various input and output circuits (all of which are not shown in the figure). These devices are controlled by the CPU 61.

The keyboard 22 includes a ten key 22d, on an upper surface of which numbers "1", "2", "3", and the like and a multiplication operator "×" are displayed, a provisional closing key 22e, and a closing key 22f. The keyboard 22 outputs an operation input of the operator with the ten key 22d, the provisional closing key 22e, and the closing key 22f to the CPU 61. The keyboard 22 is an operating unit for receiving operation from the operator.

A HDD (Hard Disk Drive) 64 is connected to the CPU 61 of the POS terminal 11. A computer program and various files are stored in the HDD 64. When the POS terminal 11 is started, all or a part of the computer program and the files stored in the HDD 64 are copied to the RAM 63 and sequentially executed by the CPU 61. An example of the computer program stored in the HDD 64 is a computer program PR for commodity sales data processing. An example of the files stored in the HDD 64 is a PLU file F1 distributed from a store computer SC and stored in the HDD 64. The PLU file F1 is a file that stores, for each commodity code uniquely allocated to each commodity, information concerning the commodity such as a name, a unit price, a commodity classification of the commodity. In other words, the PLU file F1 stores, as related information related to a commodity code, information such as a name, a unit price, and a commodity classification corresponding to the commodity code.

A communication interface 25 for executing data communication with the store computer SC is connected to the CPU 61 of the POS terminal 11 via an input and output circuit (not shown). The store computer SC is set in the backyard or the like of the store. The PLU file F1 to be distributed to the POS terminal 11 is stored in a HDD (not shown) of the store computer SC.

A connection interface 65 configured to enable data transmission and reception between the POS terminal 11 and the commodity code reading apparatus 101 is connected to the CPU 61 of the POS terminal 11. Therefore, the connection interface 65 is connected to the commodity code reading apparatus 101. A printer 66 configured to perform printing on a receipt or the like is connected to the CPU 61 of the POS terminal 11. The POS terminal 11 prints transaction contents or the like of one transaction on the receipt under the control by the CPU 61.

The commodity code reading apparatus 101 also includes a microcomputer 160. The microcomputer 160 is configured by connecting a ROM 162 and a RAM 163 to a CPU 161 via a bus. A computer program executed by the CPU 161 is stored in the ROM 162. The image pickup section 164 and a sound output section 165 are connected to the CPU 161 via various input and output circuits (all of which are not shown). The operations of the image pickup section 164 and the sound output section 165 are controlled by the CPU 161. The display and operation section 104 is connected to the POS terminal 11 via a connection interface 176. The operation of the display and operation section 104 is controlled by the CPU 61 of the POS terminal 11.

The image pickup section 164 is a CCD image sensor, a CMOS image sensor, or the like and performs image pickup from the reading window 103 under the control by the CPU 161. For example, the image pickup section 164 performs image pickup of a moving image at 30 fps. Frame images sequentially picked up by the image pickup section 164 at a predetermined frame rate are stored in the RAM 163. The sound output section 165 is a sound circuit, a speaker, and the like for generating warning sound or the like set in advance. The sound output section 165 performs alerting by sound such as warning sound under the control by the CPU 161.

Further, a connection interface 175 connected to the connection interface 65 of the POS terminal 11 and configured to enable data transmission and reception between the commodity code reading apparatus 101 and the POS terminal 11 is connected to the CPU 161. A commodity code read from an image picked up by the image pickup section 164 of the commodity code reading apparatus 101 is output via the connection interface 175 and input to the POS terminal 11 via the connection interface 65 under the control by the CPU 161.

Figure 3:
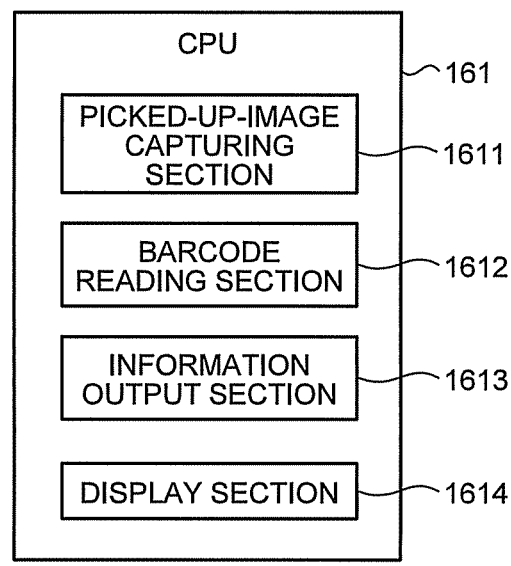
FIG. 3 is a block diagram of a functional configuration of a CPU.

Functional sections of the commodity code reading apparatus 101 realized by the CPU 161 sequentially executing the computer program are explained with reference to FIG. 3. FIG. 3 is a block diagram of a functional configuration of the CPU 161. As shown in FIG. 3, the CPU 161 sequentially executes the computer program to thereby include functions of a picked-up-image capturing section 1611, a barcode reading section 1612, an information output section 1613, and a display section 1614.

The picked-up-image capturing section 1611 outputs an image pickup ON signal to the image pickup section 164 to cause the image pickup section 164 to start an image pickup operation. The picked-up-image capturing section 1611 sequentially captures frame images picked up by the image pickup section 164 and stored in the RAM 163 after the start of the image pickup operation. The capturing of the frame images by the picked-up-image capturing section 1611 is performed in order of storage of the frame images in the RAM 163.

The barcode reading section 1612 detects the barcode BC included in the frame image captured by the picked-up-image capturing section 1611 and reads a commodity code corresponding to the barcode BC. Specifically, the barcode reading section 1612 performs, for example, detection of the barcode BC from the frame image by a pattern matching technique or detection of a two-dimensional code from a predetermined finder pattern. Subsequently, the barcode reading section 1612 converts the detected barcode BC or the detected two dimensional code into code information (e.g., a JAN code) conforming to a predetermined rule to read a commodity code corresponding to the detected barcode BC. Consequently, the commodity code reading apparatus 101 can read, from images picked up by the image pickup section 164 in the moving process of the commodity A, the barcode BC affixed to the commodity A.

The information output section 1613 outputs code information of the commodity code or the like read by the barcode reading section 1612 to the POS terminal 11 via the connection interface 175. For example, if the barcode BC affixed to the commodity A is detected from the frame image and a commodity code corresponding to the barcode BC is read, the commodity code is output to the POS terminal 11. Consequently, the POS terminal 11 can identify, referring to the FLU file F1 on the basis of the output commodity code, the commodity A read by the commodity code reading apparatus 101 and register sales and the like of the commodity A.

The information output section 1613 receives, via the connection interface 176, output of a name, a unit price, a commodity classification, and the like of the commodity acquired by the POS terminal 11 referring to the FLU file F1 on the basis of the commodity code. Specifically, when the information output section 1613 outputs the commodity code read by the barcode reading section 1612 to the POS terminal 11, the information output section 1613 acquires related information such as a name, a unit price, and a commodity classification of a commodity corresponding to the commodity code from the POS terminal 11.

The display section 1614 performs display output to the display device 106 and the customer display device 109. Specifically, the display section 1614 generates display data for performing display on the display device 106 and the customer display device 109 and outputs the display data to the CPU 61 via the connection interface 175. The CPU 61 controls the display on the display device 106 and the customer display device 109 on the basis of the display data from the display section 1614. Consequently, for example, in the customer display device 109 of the display and operation section 104, only display to the customer is performed.

Figure 4:
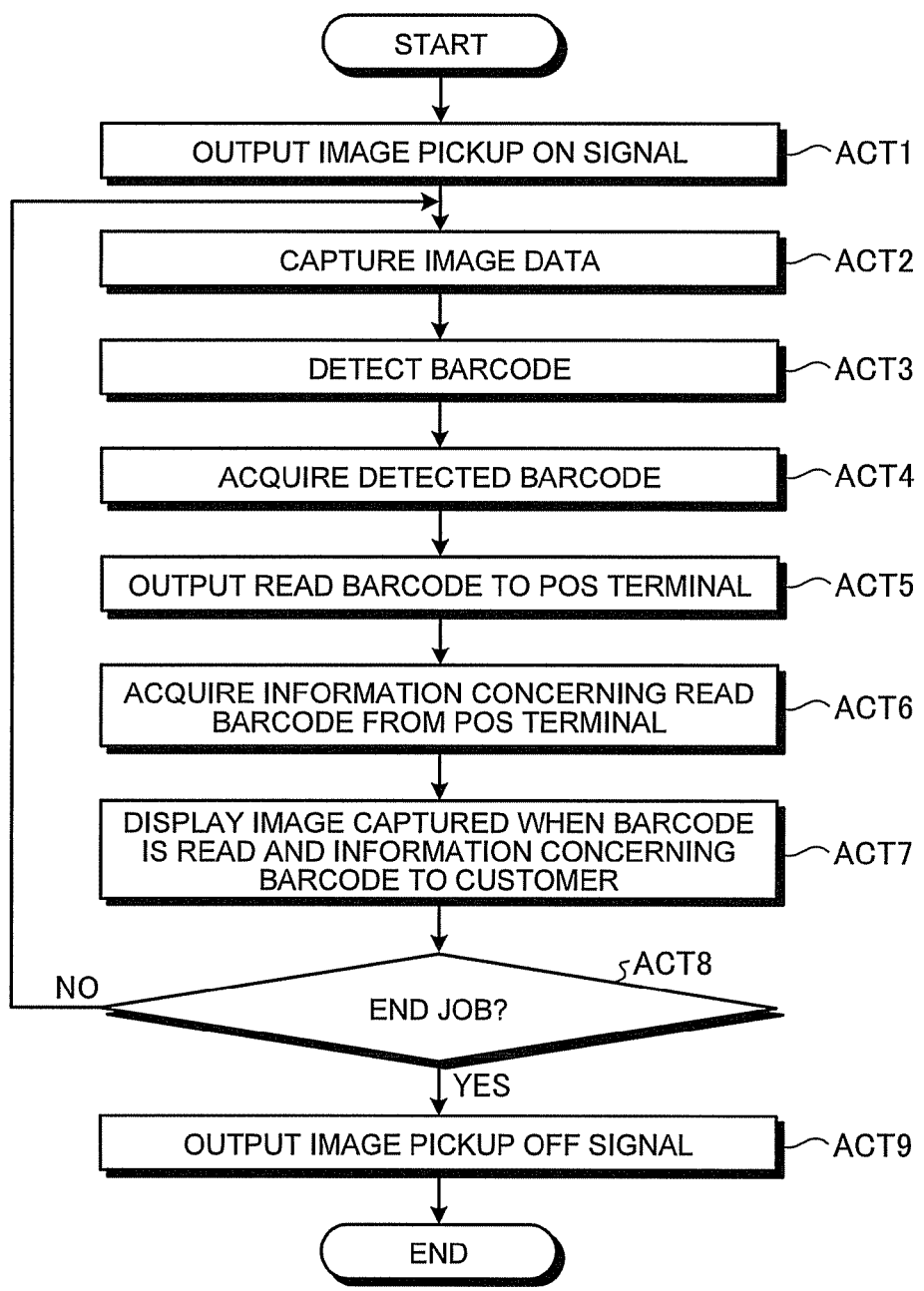
FIG. 4 is a flowchart for explaining an example of the operation of the commodity code reading apparatus according to the embodiment.

The operation of the commodity code reading apparatus 101 is explained in detail below. FIG. 4 is a flowchart for explaining an example of the operation of the commodity code reading apparatus 101 according to this embodiment.

As shown in FIG. 4, when processing is started according to, for example, the start of commodity registration by the POS terminal 11, the picked-up-image capturing section 1611 outputs an image pickup ON signal to the image pickup section 164 and starts image pickup by the image pickup section 164 (Act 1). Subsequently, the picked-up-image capturing section 1611 captures a frame image (a picked-up image) picked up by the image pickup section 164 and stored in the RAM 163 (Act 2). The barcode reading section 1612 detects the barcode BC included in the frame image captured by the picked-up-image capturing section 1611 (Act 3) and reads the detected barcode BC, i.e., reads a commodity code corresponding to the barcode BC (Act 4).

Figure 5:
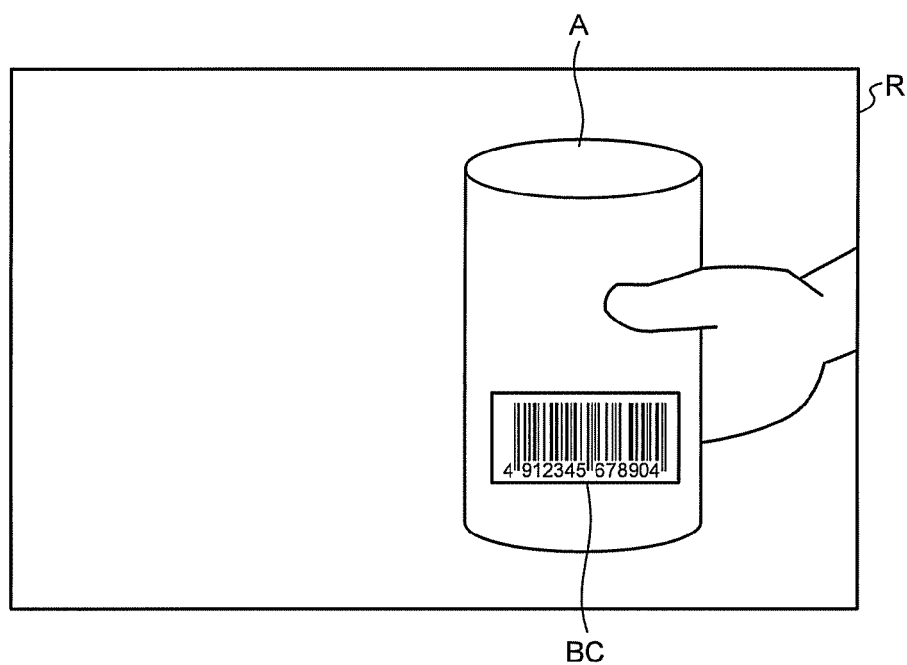
FIG. 5 is a conceptual diagram of an example of a reading area in a reading window.

FIG. 5 is a conceptual diagram of an example of a reading area R in the reading window 103. As shown in FIG. 5, if the commodity A is reflected in the reading area R in the moving process of the commodity A, in Act 4, a commodity code corresponding to the barcode BC affixed to the commodity A is read.

Subsequently, the information output section 1613 outputs the commodity code read by the barcode reading section 1612 to the POS terminal 11 via the connection interface 175 (Act 5) and acquires related information such as a name, a unit price, and a commodity classification of a commodity corresponding to the commodity code from the POS terminal 11 (Act 6).

Subsequently, the display section 1614 displays, to the customer, using the customer display device 109, the frame image captured when the barcode reading section 1612 reads the commodity code and the related information such as the name, the unit price, and the commodity classification of the commodity corresponding to the commodity code acquired from the POS terminal 11 by the information output section 1613 (Act 7). Specifically, the display section 1614 reads out, from the RAM 163, the frame image captured when the barcode reading section 1612 reads the commodity code. The display section 1614 displays the frame image in a predetermined area on the display screen of the customer display device 109. The display section 1614 generates display data for displaying the related information acquired from the POS terminal 11 in another area on the display screen of the customer display device 109 and outputs the display data to the CPU 61 via the connection interface 175. Consequently, the frame image captured when the barcode reading section 1612 reads the commodity code and the related information such as the name, the unit price, and the commodity classification of the commodity corresponding to the commodity code are displayed on the customer display device 109.

Subsequently, the CPU 161 determines whether a job is ended according to, for example, an end notification for commodity registration from the POS terminal 11 (Act 8). If the job is continued (NO in Act 8), the CPU 161 returns the processing to Act 2 and continues the processing. If the job is ended (YES in Act 8), the picked-up-image capturing section 1611 outputs an image pickup OFF signal to the image pickup section 164 to end the image pickup by the image pickup section 164 (Act 9) and ends the processing.

Figure 6:
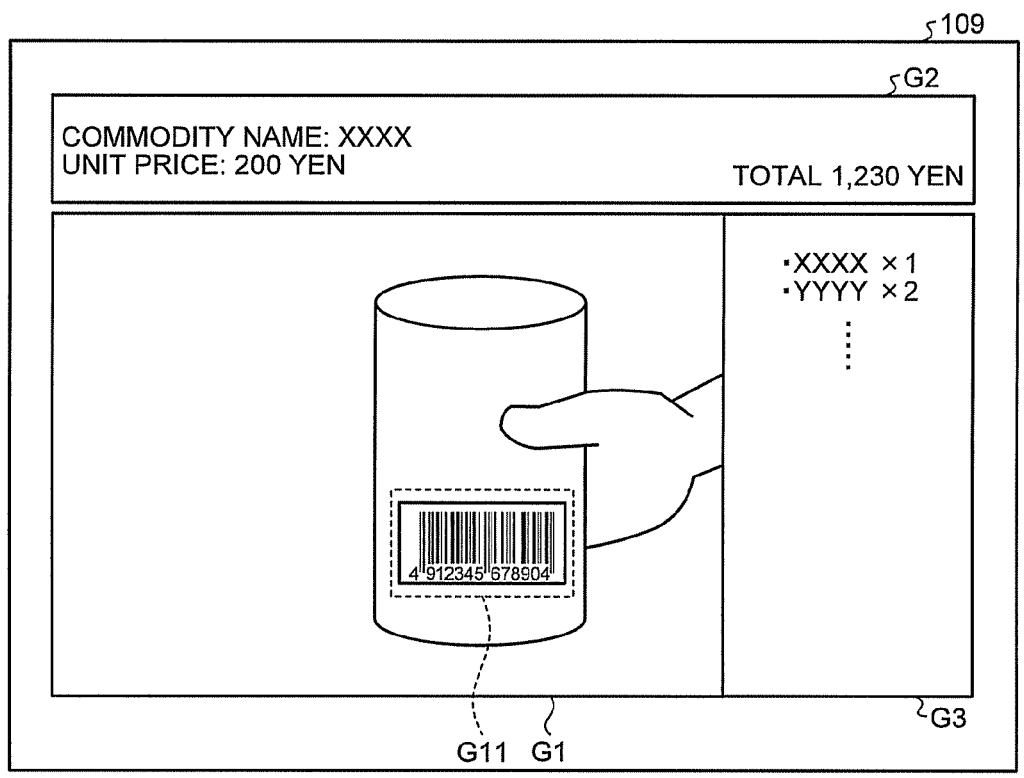
FIG. 6 is a conceptual diagram of a display example by a customer display device.

FIG. 6 is a conceptual diagram of a display example by the customer display device 109. As shown in FIG. 6, the display screen of the customer display device 109 is configured to include a display area G1, a display area G2, and a display area G3. In the display area G1, a frame image captured when the barcode reading section 1612 reads a commodity code is displayed. In the display area G2, for example, related information such as a name and a unit price of a commodity corresponding to the commodity code and a total amount obtained by totaling a unit price and the like of the commodity already registered by reading of the commodity code are displayed. In the display area G3, a history of commodities, commodity codes of which are read by the barcode reading section 1612, i.e., a history of purchased commodities, transactions of which are registered, is displayed. For example, besides a commodity name "XXXX" of a commodity presently read and displayed in the display area G2 and the number of purchased items of the commodity, a commodity name "YYYY" of a commodity read before and the number of purchased items of the commodity and the like are displayed. The display section 1614 may perform the display of the history of the purchased commodities in the display area G3 by stacking related information displayed in the display area G2 in the RAM 163 and reading out the stacked information. The CPU 61 of the POS terminal 11 may perform the display of the history of the purchased commodities in the display area G3 on the basis of information concerning purchased commodities stacked in the RAM 63.

The housing 102 makes it difficult for the customer to see the commodity A read by the reading window 103 in the moving process. However, in the commodity code reading apparatus 101, a frame image captured when the barcode reading section 1612 reads a commodity code is displayed from the display area G1 of the customer display device 109 to the customer. Therefore, the customer can easily check the commodity A when the commodity A is registered. In the commodity code reading apparatus 101, related information such as a name, a unit price, and a commodity classification of a commodity corresponding to the commodity code read by the barcode reading section 1612 is also displayed from the display area G2 of the customer display device 109 to the customer. Therefore, the customer can easily check details of the commodity A when the commodity A is registered.

As shown in FIG. 6, in the display area G1, a symbol indication G11 indicating a barcode detected when a commodity code is read is displayed to be superimposed on a frame image captured when the barcode reading section 1612 reads the commodity code. Specifically, the display section 1614 generates, on the basis of position information (coordinates in the frame image, etc.) of the barcode detected by the barcode reading section 1612 from the frame image, display data in which the symbol indication G11 is superimposed on the frame image. Consequently, the superimposed display is carried out. Besides a frame line indication surrounding the barcode shown in FIG. 6 as an example, the symbol indication G11 may be an icon image displayed to correspond to the position of the barcode. In this way, the symbol indication G11 is displayed to be superimposed on the frame image. Therefore, the customer can easily check the barcode detected when the commodity code is read.

In the example explained in this embodiment, during registration of a commodity to be purchased by the customer, a frame image captured when the barcode reading section 1612 reads a commodity code is displayed to the customer. However, it goes without saying that code information to be read is not limited to a commodity code and may be, for example, a customer code for identifying the customer described on a DM (direct mail) or a benefit coupon presented by the customer during settlement or a benefit code for identifying benefit content. In this case, an image captured when the customer code or the benefit code is read, i.e., an image obtained by picking up the DM or the benefit coupon is displayed from the customer display device 109 to the customer. The customer can easily check the read DM or benefit coupon.

The computer program executed in the commodity code reading apparatus 101 according to this embodiment is provided while being incorporated in a ROM or the like in advance. The computer program executed in the commodity code reading apparatus 101 according to this embodiment may be provided while being recorded in a computer readable recording medium such as a CR-ROM, a flexible disk (FD), a CD-R, or a DVD (Digital Versatile Disk) as a file of an installable format or an executable format.

The computer program executed in the commodity code reading apparatus 101 according to this embodiment may be provided while being stored on a computer connected to a network such as the Internet and downloaded through the network. The computer program executed in the commodity code reading apparatus 101 according to this embodiment may be provided or distributed through the network such as the Internet.

The computer program executed in the commodity code reading apparatus 101 according to this embodiment has a module configuration including the sections (the picked-up-image capturing section 1611, the barcode reading section 1612, the information output section 1613, and the display section 1614) As actual hardware, the CPU (a processor) reads out the computer program from the ROM and executes the computer program, whereby the sections are loaded onto a main storage device and the picked-up-image capturing section 1611, the barcode reading section 1612, the information output section 1613, and the display section 1614 are generated on the main storage device.

Figure 7:
FIG. 7 is a conceptual diagram of a display example in a modification.
Figure 8:
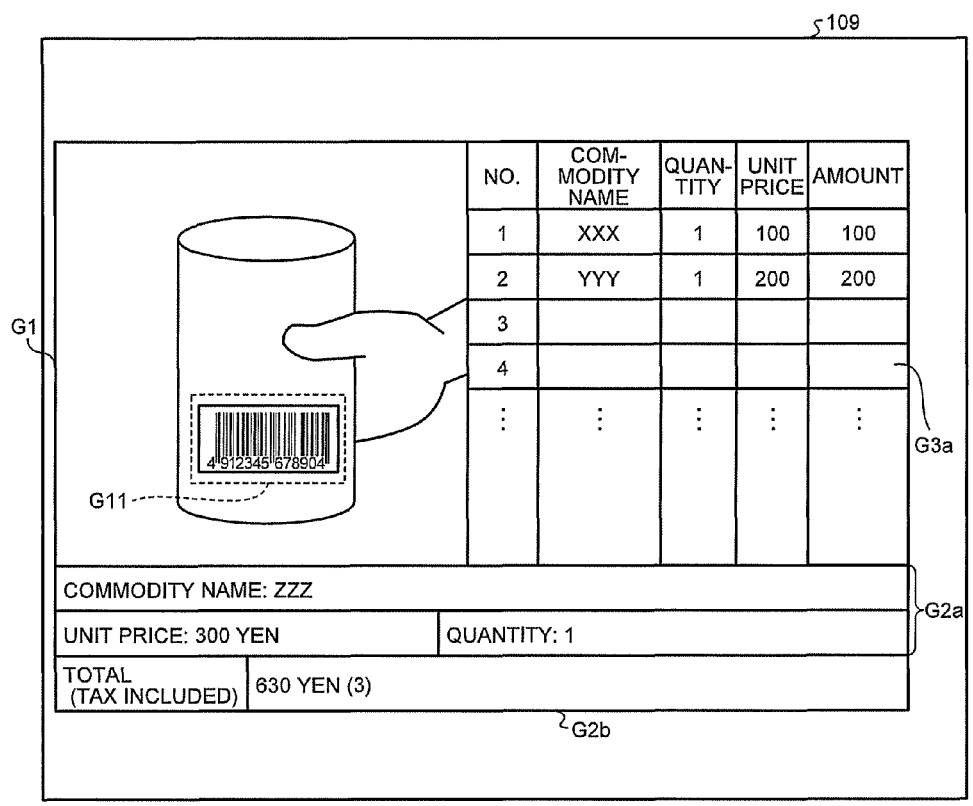
FIG. 8 is a conceptual diagram of a display example in a modification.

Modifications of the display on the customer display device 109 are explained below. FIGS. 7 and 8 are conceptual diagrams of display examples in the modifications. As shown in FIG. 7, on the display screen of the customer display device 109, a current area G2a, a total area G2b, and a detail area G3a for displaying the related information under the control by the CPU 161 are arranged around the display area G1 in which a frame image captured when a commodity code is read is displayed. Specifically, the current area G2a is arranged on the upper side of the display area G1, the total area G2b is arranged on the lower side of the display area G1, and the detail area G3a is arranged on the right side of the display area G1. The current area G2a, the total area G2b, and the detail area G3a only have to be arranged around the display area G1. As shown in FIG. 8, both the current area G2a and the total area G2b may be arranged on the lower side of the display area G1. The arrangement of the current area G2a and the total area G2b may be opposite to the arrangement shown in FIG. 7. The detail area G3a may be arranged on the left side of the display area G1.

In the current area G2a, related information such as a commodity name, the number of sold items (a quantity), and a unit price corresponding to a commodity code read by the barcode reading section 1612 most recently is displayed. In the total area G2b, information obtained by totalizing related information such as a total amount and a total number of items (a quantity) of commodities in one transaction is displayed on the basis of a commodity code sequentially read by the barcode reading section 1612. In the detail area G3a, a history of related information such as commodity names, the numbers of sold items (quantities), unit prices, and sales amounts of commodities registered as one transaction is displayed as a list on the basis of commodity codes sequentially read by the barcode reading section 1612. The list display of the history in the detail area G3a may be performed from the top in order of registration as indicated by the example shown in the figure.

In this way, the display screen on which the related information (the commodity name, the quantity, the unit price, the total amount and the total number of items in one transaction, the commodity names, the quantities, the unit prices and the sales amounts of the commodities registered as one transaction, etc.) based on the read commodity code is arranged around the display area G1 in which the frame image captured when the commodity code is read is displayed, is displayed on the customer display device 109. Consequently, the user can easily check an image captured when a commodity code is read and check related information based on the commodity code. The history of the related information such as the commodity names, the numbers of sold items (the quantities), the unit prices, and the sales amounts of the commodities registered as one transaction is displayed side by side in the detail area G3a arranged on the right or left side of the display area G1 rather than the upper or lower side of the display area G1 in which the frame image is displayed. Therefore, the user can easily check the history while looking at the frame image.

Further effects and modifications can be easily derived by those skilled in the art. Therefore, a wider form of the present invention is not limited by the specific details and the representative embodiments shown and described above. Therefore, various changes are possible without departing from the spirit or the scope of the general concept of the invention defined by the appended claims and equivalents of the claims.

What is claimed is:

1. A code reading apparatus comprising:
a housing
an image capturing section configured to capture an image of a commodity picked up by an image pickup section arranged on a depth side of a reading window arranged in a front side of the housing;
a code reading section configured to detect a code symbol included in the image and read code information corresponding to the code symbol; and
a display output section, wherein
the housing is configured to hide the commodity as the image of the commodity is picked up by the image pickup section from a customer's view from a rear side opposite to the front side of the housing, and
the display output section is configured to output an image captured in response to the code information being read to a display device provided to face the customer, the display device facing the rear side.

2. The apparatus according to claim 1, wherein the display output section superimposes, on the image captured in response to the code information being read, a symbol indication indicating the code symbol detected from the image and outputs the image.

3. The apparatus according to claim 1, further comprising an acquiring section configured to acquire related information related to the code information, wherein the display output section outputs the related information together with the image captured in response to the code information being read.

4. The apparatus according to claim 3, wherein the display output section outputs, to the display device, a display screen on which the related information is arranged around the image captured in response to the code information being read.

5. The apparatus according to claim 4, wherein, on the display screen, at least one of the related information acquired most recently and information obtained by totalizing the related information is arranged above or below the image in response to the code information being read.

6. The apparatus according to claim 4, wherein, on the display screen, a history of the related information is arranged on left or right of the image captured in response to the code information being read.

7. A control method for a code reading apparatus, comprising:
capturing an image of a commodity picked up by an image pickup section arranged on a depth side of a reading window arranged in a front side of a housing, wherein the housing hides the commodity from a customer's view from a rear side opposite the front side of the housing as the image of the commodity is picked up;
detecting a code symbol included in the image and reading code information corresponding to the code symbol; and
outputting an image captured in response to the code information being read to a display device provided to face the customer, the display device facing the rear side of the housing.

8. The method according to claim 7, wherein the outputting the image includes superimposing, on the image captured in response to the code information being read, a symbol indication indicating the code symbol detected from the image and outputting the image.

9. The method according to claim 7, further comprising acquiring related information related to the code information, wherein
the outputting the image includes outputting the related information together with the image captured in response to the code information being read.

10. The method according to claim 9, wherein the outputting the image includes outputting, to the display device, a display screen on which the related information is arranged around the image captured in response to the code information being read.

* * * * *